(12) United States Patent
Wald et al.

(10) Patent No.: US 9,886,087 B1
(45) Date of Patent: Feb. 6, 2018

(54) DYNAMICALLY OPTIMIZING USER INTERFACES

(71) Applicant: ALLSCRIPTS SOFTWARE, LLC, Chicago, IL (US)

(72) Inventors: Eric Robert Wald, Raleigh, NC (US); David Windell, Raleigh, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 200 days.

(21) Appl. No.: 14/093,469

(22) Filed: Nov. 30, 2013

(51) Int. Cl.
*G06F 3/048* (2013.01)
*G06F 3/01* (2006.01)
*G06F 3/0481* (2013.01)

(52) U.S. Cl.
CPC ............ *G06F 3/013* (2013.01); *G06F 3/0481* (2013.01)

(58) Field of Classification Search
CPC .............................. G06F 3/0481; G06F 3/0482
See application file for complete search history.

(56) References Cited

U.S. PATENT DOCUMENTS

| | | | | |
|---|---|---|---|---|
| 5,831,594 | A | * | 11/1998 | Tognazzini et al. .......... 345/156 |
| 7,013,258 | B1 | * | 3/2006 | Su et al. ............................ 704/1 |
| 2010/0205667 | A1 | * | 8/2010 | Anderson ............... G06F 3/013 726/19 |
| 2014/0168056 | A1 | * | 6/2014 | Swaminathan .... G06K 9/00604 345/156 |
| 2014/0250395 | A1 | * | 9/2014 | Tanaka ......................... 715/765 |
| 2014/0328505 | A1 | * | 11/2014 | Heinemann et al. ......... 381/303 |

* cited by examiner

*Primary Examiner* — Anil N Kumar
(74) *Attorney, Agent, or Firm* — Tillman Wright, PLLC; Chad D. Tillman; Jeremy C. Doerre

(57) ABSTRACT

One aspect of the present invention relates to a method for optimizing a user interface (UI) for an active application over a computing device. The method includes receiving the gaze information, including gaze location, of a user's gaze on the UI, determining a first section of a plurality of sections of the UI associated with the received gaze location, and muting other of the plurality of sections outside of the first section, such that the first section in the UI remains active.

12 Claims, 6 Drawing Sheets

FIG. 2

DYNAMICALLY OPTIMIZING USER INTERFACES

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates to an application user interface. More specifically, the present invention relates to the navigation through an application over a user interface.

Mobile devices are very well suited to use in clinical environments because of their portability and computing power in a small package. Indeed, mobile device usage with both phone and tablet form factors is increasing greatly.

Complex User Interfaces, such as those seen in Electronic Medical Records Software applications, are often full of disparate information, options, widgets and other elements that compete for the user's attention at a given time. In the clinical setting there are many situations in which the clinician makes decisions that would have very serious safety ramifications if they made the wrong decision. There are similarly many decision points in medical software where the clinician is executing an action. Errors may be made in the medical field (or in other applications) that are due to "screen clutter" or the inclusion of distracting information within a user interface.

Currently, applications place most of the onus on the user to actively change screen elements to limit distractions, or provide no way at all of allowing the user to mute competing information. This may be accomplished in these systems by allowing the user to zoom in on a certain area of the UI manually, using a finger gesture or selecting the zooming function from a menu.

Additionally, in an effort to reduce error or reduce screen clutter, UI designers and information architects may 'bury' items in ever deeper menu structures to ensure that options, lists, and other information sources do not overwhelm the user in the UI.

Another element currently used to direct attention includes use of windows, e.g., opening a new window against a grey-scaled background. This element, though, requires a "state change" and reduces the user's situational awareness while adding additional clicks/steps for the user to accomplish their goal.

Therefore, there exists a need for an improved method for interacting with a mobile device. This and other needs are addressed by one or more aspects of the present invention.

SUMMARY OF THE INVENTION

The present invention includes many aspects and features. Moreover, while many aspects and features relate to, and are described in, the context of tablet computing, the present invention is not limited to use only in this context, as will become apparent from the following summaries and detailed descriptions of aspects, features, and one or more embodiments of the present invention.

Accordingly, one aspect of the present invention relates to a method for optimizing a user interface (UI) for an active application over a computing device. The method includes receiving the gaze information, including gaze location, of a user's gaze on the UI, determining a first section of a plurality of sections of the UI associated with the received gaze location, and muting other of the plurality of sections outside of the first section, such that the first section in the UI remains active.

In a feature of this aspect, the method further includes receiving an indication from the user to optimize the UI of the active application.

In another feature of this aspect, the method further includes receiving active application information including information relating to the location of the plurality of sections of the UI.

In another feature of this aspect, the gaze location is located within the first section.

In another feature of this aspect, muting the other of the plurality of sections includes one of graying out the other of the plurality of section and blurring out the other of the plurality of sections.

In another feature of this aspect, the method further includes activating a second section when the received gaze location is no longer located within the first section, the second section being one of the plurality of muted sections and muting the first section.

Another aspect of the present invention relates to a computing device comprising a processor, the processor including an optimizer application comprising a plurality of computer readable instructions for implementing a method for optimizing a user interface (UI) for an active application. The method includes receiving the gaze information, including gaze location, of a user's gaze on the UI, determining a first section of a plurality of sections of the UI associated with the received gaze location, and muting other of the plurality of sections outside of the first section, such that the first section in the UI remains active.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

FIG. 2 is an example illustration of a Clinical Note;

DETAILED DESCRIPTION

Figure 1:
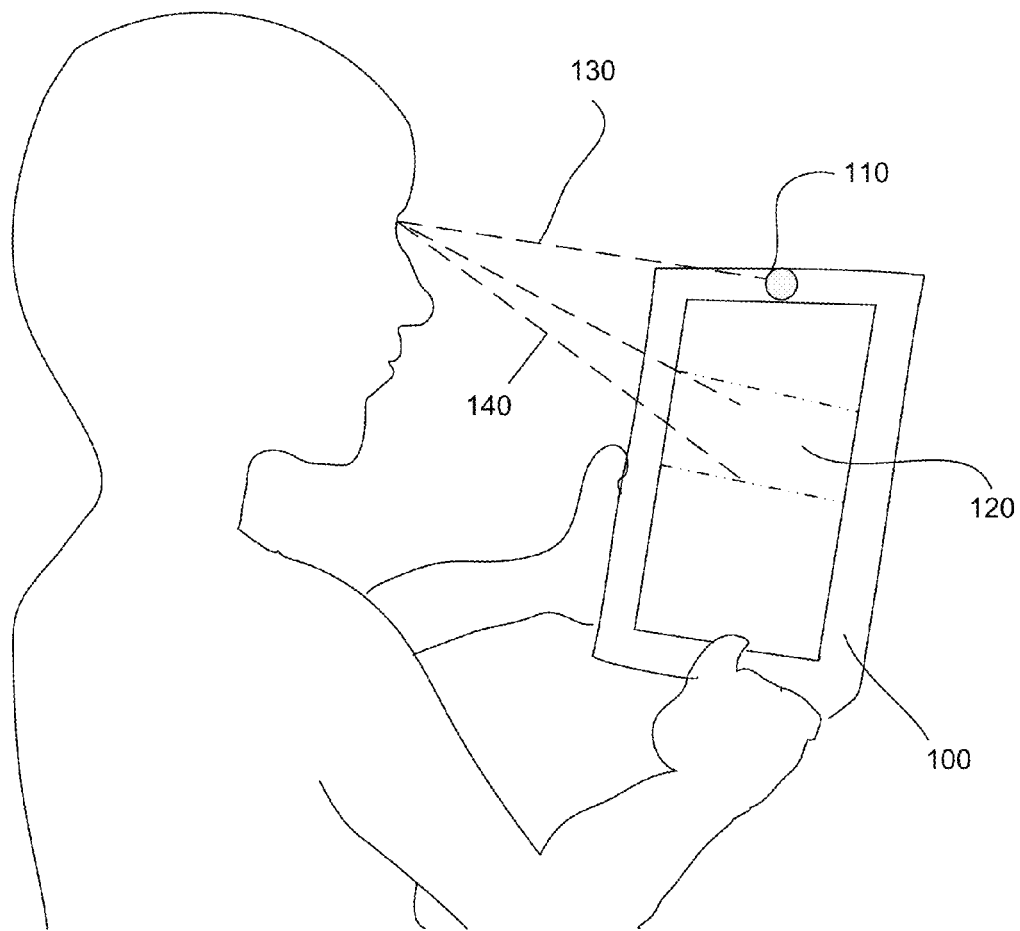
FIG. 1 is an example illustration of a computing device executing an implementation of a method for optimizing a UI in accordance with the present invention.

Referring now to the drawings, one or more preferred embodiments of the present invention are next described. The following description of one or more preferred embodiments is merely exemplary in nature and is in no way intended to limit the invention, its implementations, or uses.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

A computing device may be any type of device configured to operate and/or communicate in a wired and/or wireless environment. By way of example, the computing device may be configured to transmit and/or receive wireless signals and may include a smartphone, a laptop, a netbook, a tablet, a personal computer and the like. The computing device includes a memory for storing, for example, an interactive application, and a processor.

The interactive application (software) comprises a set of machine readable code stored on a machine readable medium and is executed by a processor included in the computing device. The application provides user interface tools in the form of graphical screen displays which allow the user to access information.

In the clinical setting there are many situations in which the clinician makes decisions that would have very serious safety ramifications if they made the wrong decision. There are similarly many decision points in medical software where the clinician is executing an action. Nearly every screen in current medical records software where such decisions are being made is downtrodden with superfluous information that may or may not impact the decision being made, but may distract the user equally regardless of importance to the current decision.

An optimizer function is disclosed for optimizing the user interface (UI) displayed to a user is disclosed. The optimizer function allows the user interface to keep active the area of the UI for which the user is currently paying attention and mute the remaining areas of the UI that may act as a distraction to the user. In accordance with this method, a computing device 100, an example illustrated in FIG. 1, includes front facing camera 110 and one or more processors (not shown) for executing one or more applications. An application includes a plurality of machine executable instructions that are executed by the one or more processors to perform the disclosed method.

In an implementation of the disclosed method, the optimizer application is executed by one or more processors in the computing device. At least one of the one or more processors is executing an active application. While the active application is running, a user may select the activation of the disclosed optimizer function. The optimizer function may be executed by any of the one or more processors included in the computing device 100. In a implementation of the optimizer function, competing information will be either "blurred" or greyscaled to reduce their impact on the user's attention Front of device cameras provide the resolution required for basic eye tracking capabilities. The front facing camera 110 included in the computing device 100 is utilized by an eye tracking software application, executed by at least one of the one or more processors, that maintains a level of certainty of the user's current area of attention in the user interface 120. Eye tracking applications are known in the art. The eye tracking application focuses on the pupil of the participants eyes 130 and determines the direction 140 and concentration of their gaze. The software generates data about these actions. The eye tracking application provides the optimizer function with information relating to where on the display the user is currently gazing (gaze information), e.g., the location of the user's gaze in the UI (gaze location). The specific eye tracking application used is not germane to the present invention. Therefore, any eye tracking application may be used.

The location of the user's gaze/attention is preferably provided as an area on the display based on, for example, pixel range, quadrant of the display, etc. It should be noted that the type of gaze information provided by the eye tracking application is known to the optimizer and therefore is manipulated by the optimizer to perform the present invention.

The optimizer function processor also receives active application information from the current active application that is being used by the user. The active application information includes specific information relating to how the application UI is set up so that the optimizer function processor can determine what area of the UI the user is paying attention to.

Using the current application information and the gaze information from the eye tracking application, the processor is able to determine where within the currently displayed UI that the user is paying attention.

Once the processor has determined what the user is paying attention to, the portion of the UI that the user is paying attention is activated, while the other sections of the UI muted, e.g., greyscaled or blurred out, such that the active portion is easily viewed by the user, without the distractions caused by the muted sections.

Figure 2:
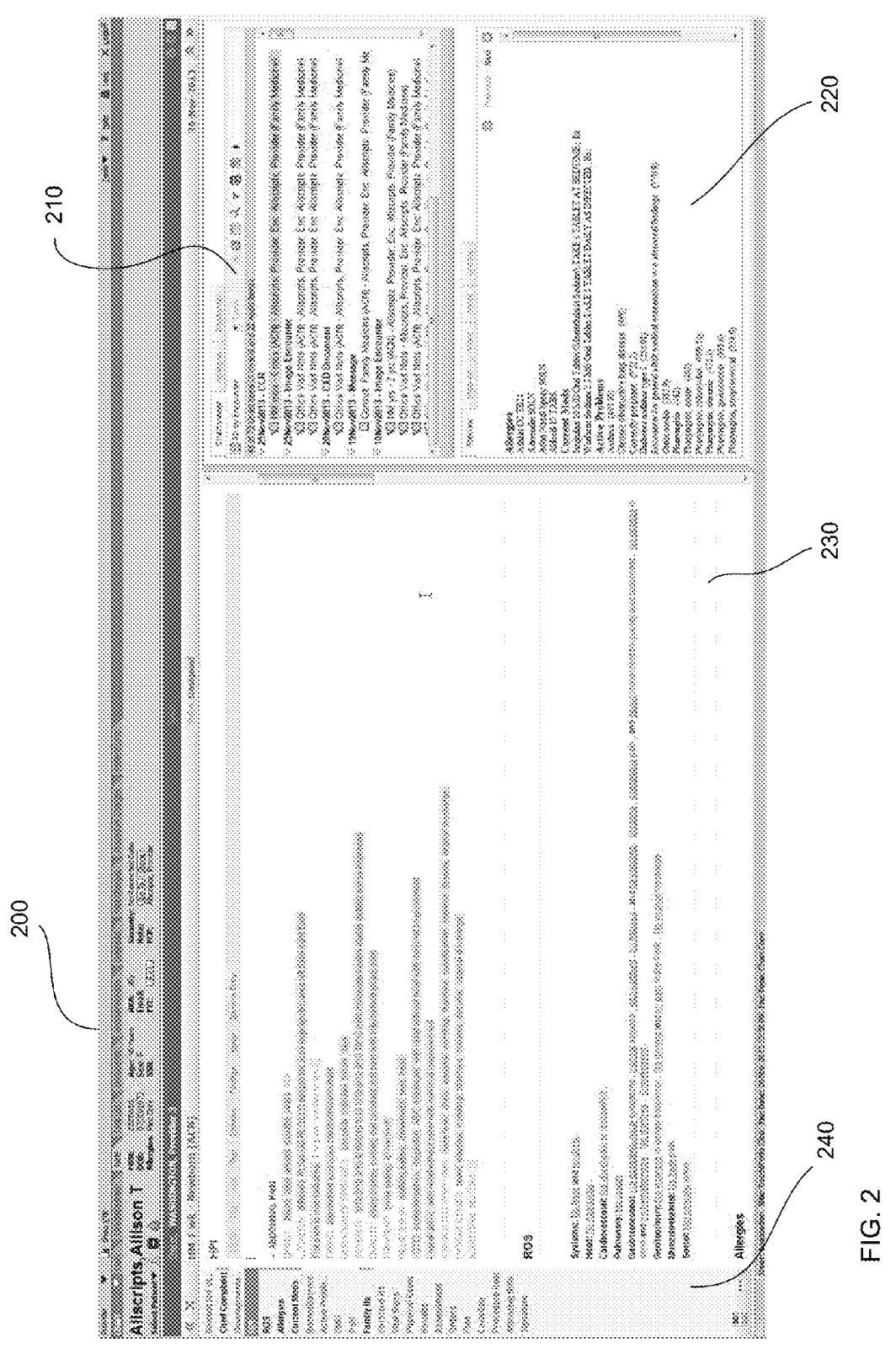

An example illustration of an UI of an EMR application, such as a Clinical Note, is shown in FIG. 2. In this example Note there are different discrete sections 210, 220, 230 and 240 of the user interface (i.e. containing elements in an HTML-like application). Because so much information is being presented, the user may select to run the UI optimizer function to assist the user in focusing on the information being reviewed by the user.

Figure 3:
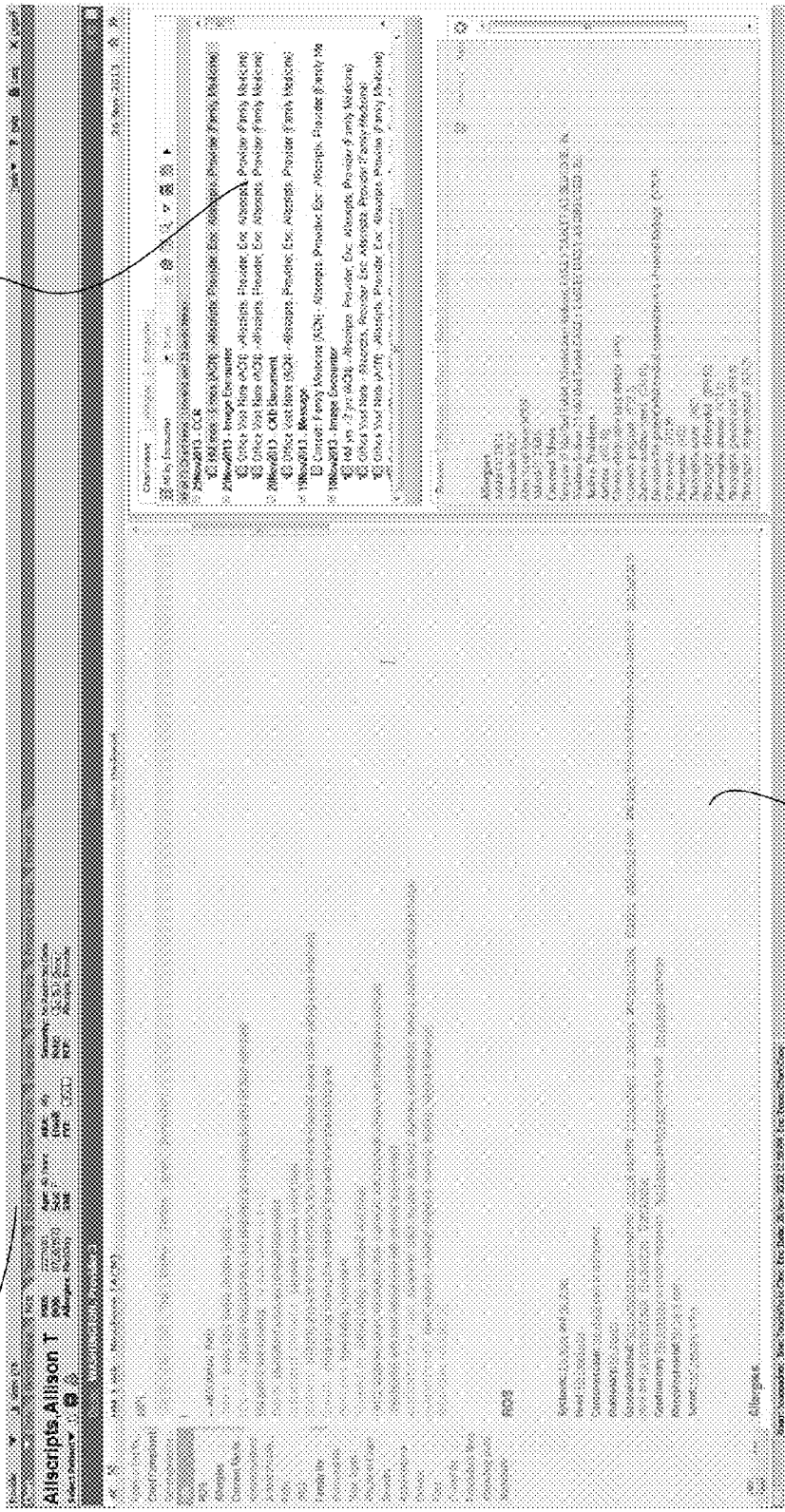
FIG. 3 is an example illustration of the Clinical Note of FIG. 2 wherein sections of the UI have been muted in accordance with the present invention.

In an implementation of the optimizer function, when a user's gaze moves from one section 210 of the UI 200 to another section 230, for example, contrast dynamically changes to mute those areas 210, 220 and 240 in which no attention is being paid. If a user is determined to be rapidly moving from one section to another, only those sections that are actively being attended to will show full contrast while the remainder of the UI is being muted. Determining which section An example illustration of the UI 300 when the user's gaze has been determined to be fixed in a certain area of the UI 300, for example area 310, is shown in FIG. 3. As illustrated, the processor has determined from the gazing information and the application information that the user is paying attention to section 310. In an implementation of the optimizer function, when a user's gaze moves from one section of the UI 300 to another section 310, for example, contrast dynamically changes to mute those areas 320, 330 and 340 in which no attention is being paid.

If a user is determined to be rapidly moving from one section to another, only those sections that are actively being attended to will show full contrast while the remainder of the UI 300 is being muted.

It is preferable that if the gazing information is determinative that the user's gaze is rapidly moving across the screen (such as in a "search" situation), then the optimizer function, preferably, will not mute any sections of the UI.

Figure 4:
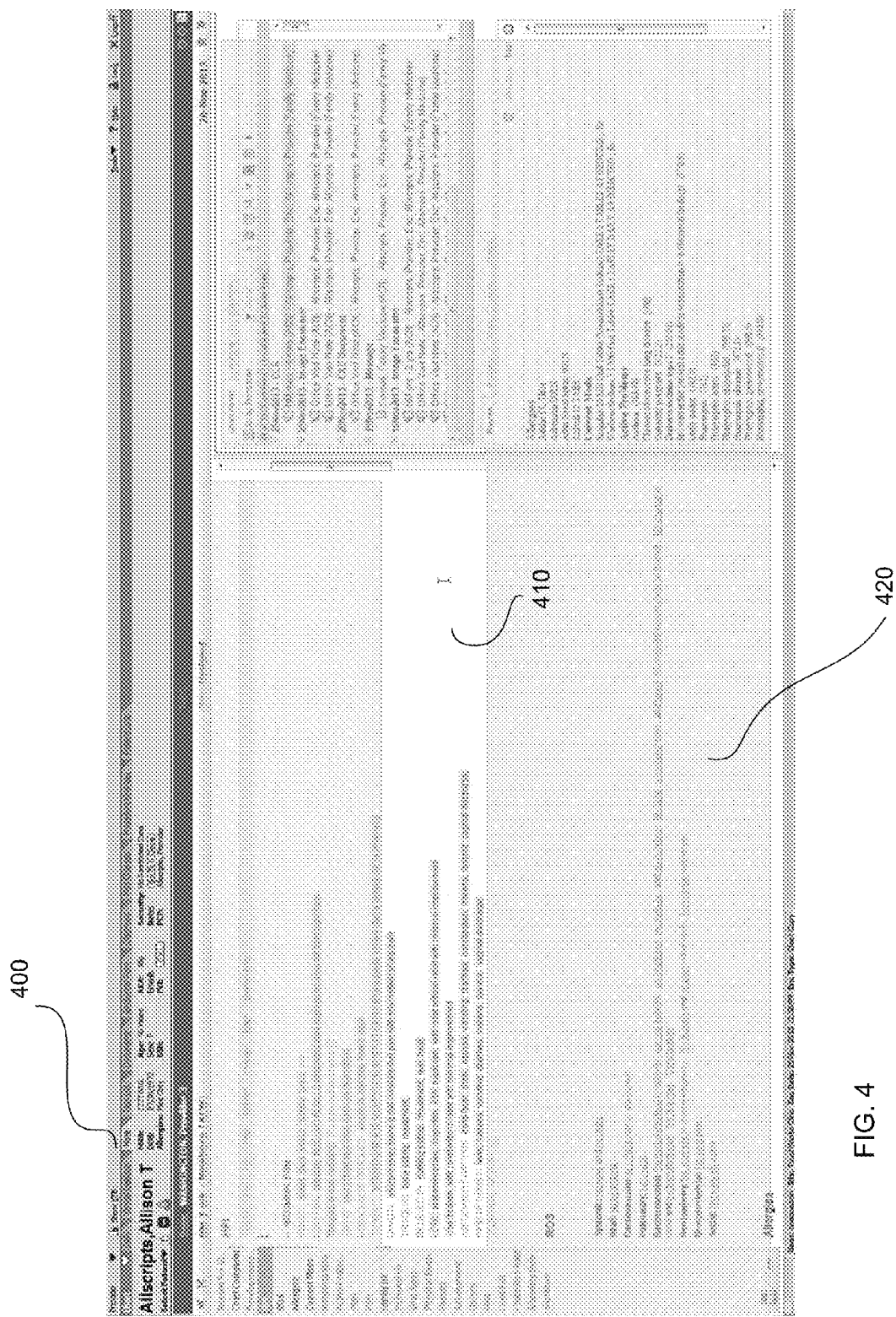
FIG. 4 is an example illustration of the Clinical Note of FIG. 2 wherein the UI has been muted except for an area around the location of the user's gaze in accordance with the present invention.

Depending on the level of detail provided by the eye tracking application to the processor, in an alternative implementation, the processor is able to keep active specific lines of text that are being read by the user. An example illustration of this alternative implementation is shown in FIG. 4. As illustrated, the UI 400 includes a plurality of discrete sections. The processor has determined that the user is paying attention to certain lines in the UI, for example the user is reading a portion of the Clinical Note. Accordingly, the processor keeps active a few lines 410 of the Clinical Note that surrounds the area that the user is paying attention to, and mutes (greys out) the other areas 420 of the UI that are not being paid attention to.

Figure 5:
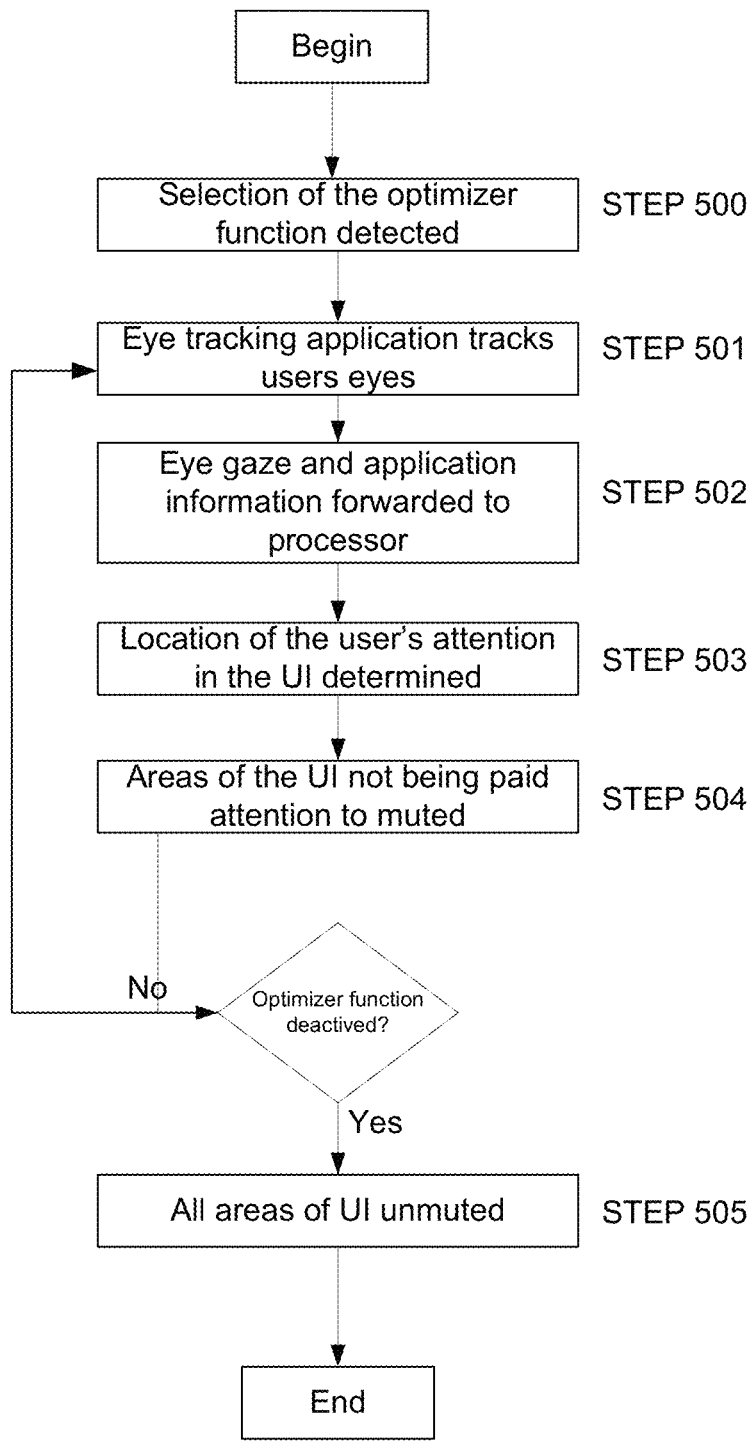
FIG. 5 is an example flow diagram of the method of optimizing a UI in accordance with the prevention.

An example flow diagram of the method of optimizing the UI to the focus the user's attention is illustrated in FIG. 5.

As the user is operating within an active application, the user selects the optimizer function for use in the active application. STEP 500. Once the optimizer function is initiated, the eye tracking application tracks the location of the user's eyes and the location of the user's gaze on the display. STEP 501. The user's gaze information is then forwarded to a processor as well as the active application information relating to the layout of the UI. Step 502.

Upon receipt of the gaze information and the application information, the processor determines where in the application the user is paying attention, STEP 503, and the areas of the UI for which attention is not being paid is muted by the processor. STEP 504. The eye tracking application continues to track the location of the user's eyes, STEP 501, and forwards the gaze information to the processor. STEP 502. When it is determined that the user selects to deactive the optimizer function or it is determined that the user is not looking at the UI, all areas of the UI are activated (e.g., unmated). STEP 505.

Figure 6:
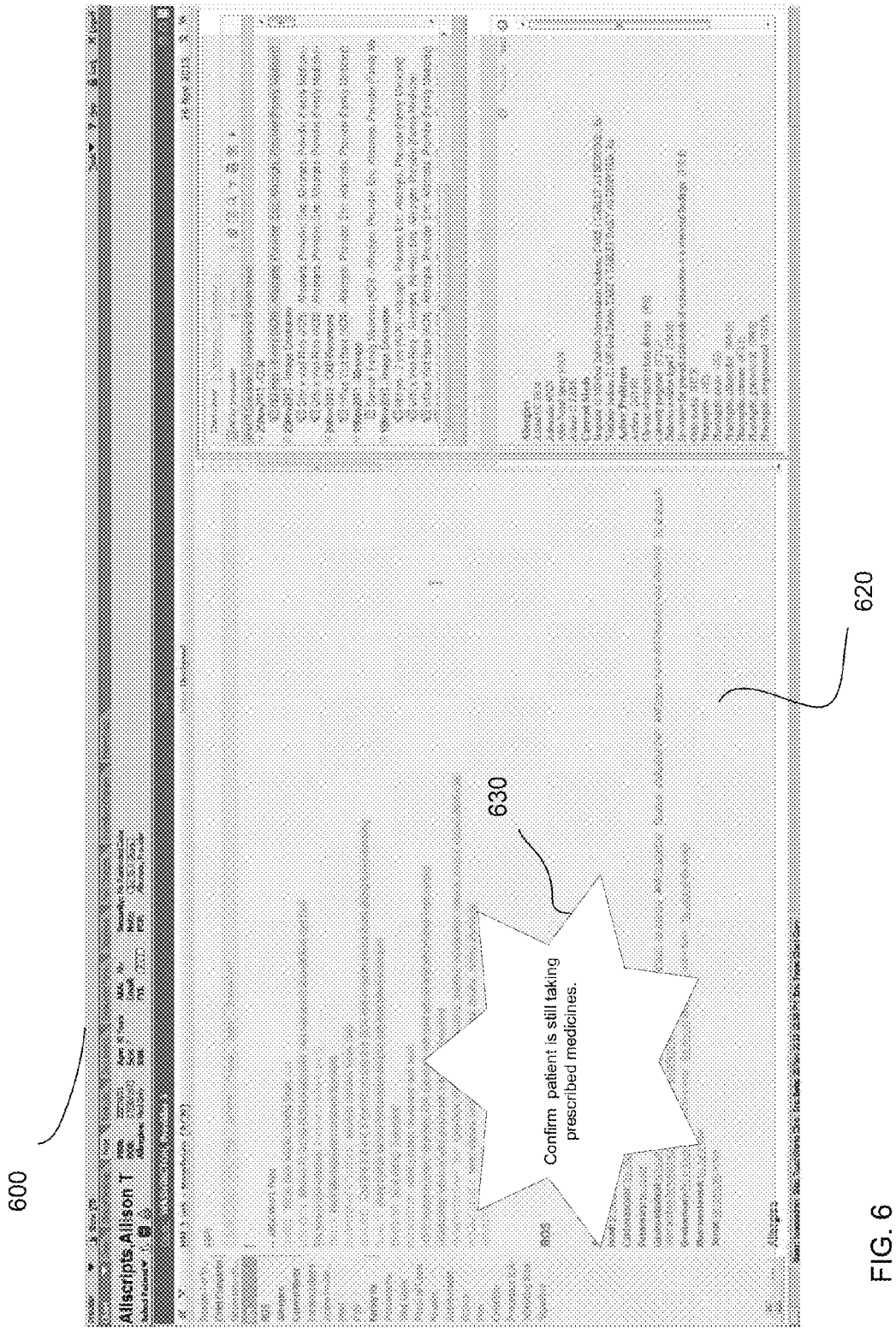
FIG. 6 is an example illustration of the Clinical Note of FIG. 2 wherein a pop-up mutes all sections of the UI except the pop-up in accordance with the present invention.

In another implementation of the disclosed method, the active area in the UI that is being paid attention to by the user may be muted and another area in the UI activated automatically when the active application requires something from the user, or requires that the user review certain information. An example illustration of this implementation is shown in FIG. 6. As illustrated, UI 600 is fully muted except for the pop up message 630 from the active application. When the pop-up message 630 is displayed, the previous unmated area of the UI 610 is muted along with the originally muted area 620. The activation of the pop-up message 630 and the muting of the previously active area 610 assists the user in focusing on the pop-up without distraction from other areas displayed in the UI 600.

An advantage of the disclosed implementations for a user in an EMR setting (as well as for the patient) is the reduction in errors. Additional advantages include passively directing attention (saving significant time and effort clicking through menu structures and overlapping windows), reduction in overall cognitive load, and use across multiple devices with front mounted cameras. The present invention allows more information to be placed into a mobile UI thus requiring less code and/or design changes while maintaining high levels of effectiveness and patient safety.

Alternatively, as eye tracking software becomes more and more refined (and as more processing power becomes available), the fidelity by which the muting of background information will ever increase. For example, each pixel can potentially reflect the amount of attention actively being paid to it and the surrounding pixels and changes in color, brightness, and other design parameters can reflect its current state of relative importance.

In other implementations, other design parameters of the UI that may be altered include color/opacity, effect (such as glow), use of icons, disabled states, text "weight", animation, overlays (filtering, etc), and ad infinitum.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for optimizing a user interface for a healthcare software application running on a computing device, the method comprising:
   (a) displaying, via a display associated with the computing device, an interface of an electronic health records software application, the interface comprising a plurality of sections;
   (b) continuously
   (i) monitoring, utilizing one or more cameras associated with the computing device, a user's eyes as the user interacts with the electronic health records software application, and
   (ii) identifying, based on the continuous monitoring, a section of the interface that the user's gaze is focused on,
   (iii) wherein the continuously monitoring and identifying comprises continuously monitoring and identifying during a first period in which
      (A) the user's gaze is focused on a first section of the plurality of sections, then
      (B) the user's gaze moves rapidly from the first section of the plurality of sections to a second section of the plurality of sections, then
      (C) the user's gaze moves rapidly from the second section to the first section, and then
      (D) the user's gaze moves rapidly from the first section to the second section;
   (d) determining, based on the continuous monitoring and identification during the first period, that the user's gaze is rapidly moving between the first section of the plurality of sections and the second section of the plurality of sections; and
   (e) modifying the interface, based on the determination that the user's gaze is rapidly moving between the first and second sections, to emphasize the first and second sections by greying out other sections of the plurality of sections that are not the first section or the second section.

2. The method of claim 1, wherein the computing device comprises a smartphone.

3. The method of claim 1, wherein the computing device comprises a laptop.

4. The method of claim 1, wherein the computing device comprises a netbook.

5. The method of claim 1, wherein the computing device comprises a tablet.

6. The method of claim 1, wherein the computing device comprises a personal computer.

7. A method for optimizing a user interface for a healthcare software application running on a computing device, the method comprising:
   (a) displaying, via a display associated with the computing device, an interface of an electronic health records software application, the interface comprising a plurality of sections;
   (b) continuously
   (i) monitoring, utilizing one or more cameras associated with the computing device, a user's eyes as the user interacts with the electronic health records software application, and
   (ii) identifying, based on the continuous monitoring, a section of the interface that the user's gaze is focused on,
   (iii) wherein the continuously monitoring and identifying comprises continuously monitoring and identifying during a first period in which
      (A) the user's gaze is focused on a first section of the plurality of sections, then
      (B) the user's gaze moves rapidly from the first section of the plurality of sections to a second section of the plurality of sections, then
      (C) the user's gaze moves rapidly from the second section to the first section, and then
      (D) the user's gaze moves rapidly from the first section to the second section;
   (d) determining, based on the continuous monitoring and identification during the first period, that the user's gaze is rapidly moving between the first section of the plurality of sections and the second section of the plurality of sections; and
   (e) modifying the interface, based on the determination that the user's gaze is rapidly moving between the first and second sections, to emphasize the first and second sections by blurring out other sections of the plurality of sections that are not the first section or the second section.

8. The method of claim 7, wherein the computing device comprises a smartphone.

9. The method of claim 7, wherein the computing device comprises a laptop.

10. The method of claim 7, wherein the computing device comprises a netbook.

11. The method of claim 7, wherein the computing device comprises a tablet.

12. The method of claim 7, wherein the computing device comprises a personal computer.

* * * * *